United States Patent
Chen et al.

(10) Patent No.: US 9,139,713 B2
(45) Date of Patent: Sep. 22, 2015

(54) STABILIZER AND COMPOSITION INCLUDING THE SAME

(71) Applicant: DOUBLE BOND CHEMICAL IND., CO., LTD., New Taipei (TW)

(72) Inventors: Chiung-Ta Chen, New Taipei (TW); Chih-Wei Lin, New Taipei (TW); Ming-Yang Chien, New Taipei (TW); En-Ching Wang, New Taipei (TW); Chien-Liang Liu, Taipei (TW)

(73) Assignee: DOUBLE BOND CHEMICAL IND., CO., LTD., New Taipei (TW)

( * ) Notice: Subject to any disclaimer, the term of this patent is extended or adjusted under 35 U.S.C. 154(b) by 0 days.

(21) Appl. No.: 14/047,017

(22) Filed: Oct. 7, 2013

(65) Prior Publication Data
US 2015/0038622 A1  Feb. 5, 2015

(30) Foreign Application Priority Data
Jul. 30, 2013 (TW) .............................. 102127303 A

(51) Int. Cl.
C08K 5/52   (2006.01)
C08K 5/375  (2006.01)
C08K 5/378  (2006.01)
C08L 53/02  (2006.01)

(52) U.S. Cl.
CPC ........................... C08K 5/52 (2013.01)

(58) Field of Classification Search
CPC .......... C08K 5/52; C08K 5/005; C08K 5/375; C08K 5/378; C08L 53/02
USPC .................. 524/100, 128, 151, 147; 106/503; 252/402
See application file for complete search history.

(56) References Cited

U.S. PATENT DOCUMENTS 5,561,178 A *  10/1996 Prabhu ............................ 524/95
2007/0049672 A1 *  3/2007 Norris ........................... 524/302

FOREIGN PATENT DOCUMENTS

| CN | 101805502 | 8/2010 |
| CN | 103210031 | 7/2013 |
| JP | 2002241574 | 8/2002 |
| JP | 4958438 | 6/2012 |
| TW | 561173 | 11/2003 |
| TW | 200427669 | 12/2004 |
| TW | 200621884 | 7/2006 |
| WO | WO 2012/065919 | * 5/2012 |

OTHER PUBLICATIONS

"Office Action of China Counterpart Application," issued on Sep. 12, 2014, p. 1-p. 6, in which the listed references (Ref. 1-2) were cited.
"Office Action of Taiwan Counterpart Application," issued on Oct. 24, 2014, p. 1-p. 4, in which the listed reference (Ref. 2) was cited.

* cited by examiner

Primary Examiner — James J Seidleck
Assistant Examiner — Deve E Valdez
(74) Attorney, Agent, or Firm — Jianq Chyun IP Office

(57) ABSTRACT

A stabilizer including a first component, a second component, and a third component is provided. The first component is a compound represented by formula (1),

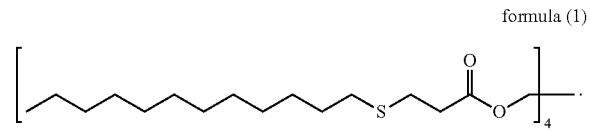

The second component is a compound represented by formula (2),

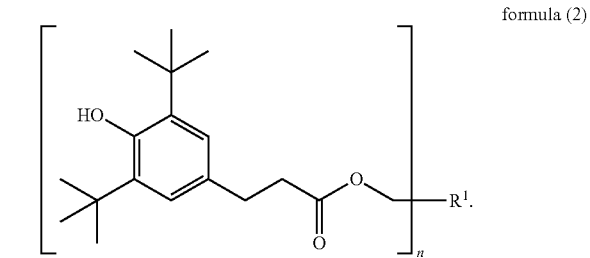

The third component is a compound represented by formula (3),

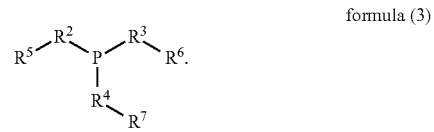

9 Claims, No Drawings

STABILIZER AND COMPOSITION INCLUDING THE SAME

CROSS-REFERENCE TO RELATED APPLICATION

This application claims the priority benefits of Taiwan application serial no. 102127303, filed on Jul. 30, 2013. The entirety of the above-mentioned patent applications is hereby incorporated by reference herein and made a part of this specification.

BACKGROUND OF THE INVENTION

1. Field of the Invention

The invention relates to a stabilizer, and more particularly, to a stabilizer for a polymer.

2. Description of Related Art

With the development of the chemical industry, synthetic polymers have been widely applied in various fields such as adhesives, photoresists, electrolyte membrane of fuel cells, and insulating materials.

In general, polymers need to withstand high temperature processing and are used under light and heat. Therefore, oxidation and changes to the chemical structure of the polymer during processing or use cause chemical changes such as degradation and fading (such as yellowing) to the polymer. To improve the issues, various additives are usually added to the polymer to reduce the degree of degradation, crosslinking reaction, or fading of the polymer. The additives are, for instance, lubricants, antioxidants, stabilizers, and tougheners.

JP4958438 discloses a composition including a hindered phenolic antioxidant having a phenolic hydroxy group, a secondary amine compound, and a sulfur-containing compound having a thioether group. JP-A 2002-241574 also discloses a thermoplastic resin composition including a hindered phenolic antioxidant and a sulfur based stabilizer. TW Patent Application No. 88104432 discloses a stabilizer containing phosphorus trichloride and sulfide. TW Patent Application No. 93103287 discloses a stabilizer containing phosphite and phosphonates. TW Patent Application No. 94123139 discloses a stabilizer containing propionate alkyl ester. Although currently many polymer additives have been developed for preventing degradation to the polymer, issues of degradation or fading still exist for compositions or polymers using a stabilizer under conditions of light and heat.

As a result, the development of a stabilizer suitable for polymers is urgently needed for preventing issues of degradation or fading of the polymer and to increase the degree of chemical change resistance of the polymer.

SUMMARY OF THE INVENTION

The invention provides a stabilizer for a polymer, thereby preventing chemical changes to the polymer such as degradation or fading due to lighting or heating.

The invention provides a stabilizer. The stabilizer includes a first component, a second component, and a third component. The first component is a compound represented by formula (1),

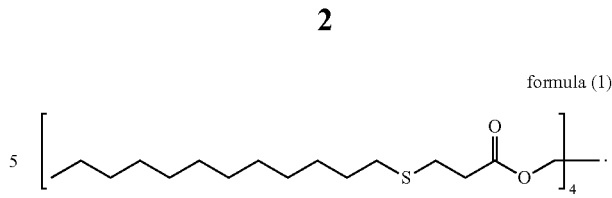

formula (1)

The second component is a compound represented by formula (2),

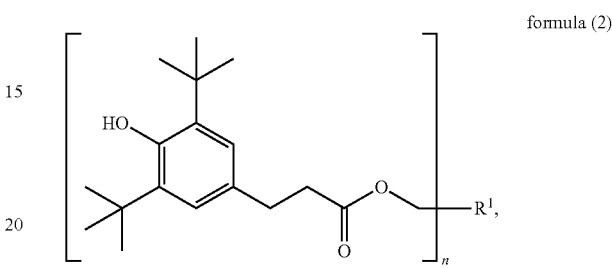

formula (2)

wherein n is 1 or 4, and when n is 1, $R^1$ is a $C_1$-$C_{18}$ alkyl group, and when n is 4, $R^1$ is 2,2-dimethylprop-1,3,1',1''-tetrayl.

The third component is a compound represented by formula (3),

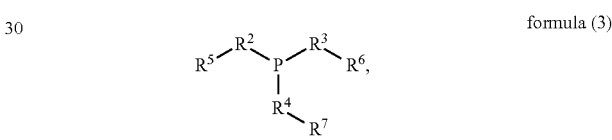

formula (3)

wherein $R^2$, $R^3$, and $R^4$ are each independently a single bond or oxygen, and $R^5$, $R^6$, and $R^7$ are each independently selected from the group consisting of a $C_1$-$C_{18}$ alkyl group, a $C_1$-$C_{18}$ alkyl group having a substituent, a $C_6$-$C_{15}$ aryl group, and a $C_6$-$C_{15}$ aryl group having a substituent.

In an embodiment of the invention, the second component is the compound represented by formula (2), and $R^1$ is selected from the group consisting of $C_7$, $C_8$, $C_9$, $C_{16}$, $C_{17}$, and $C_{18}$ alkyl groups.

In an embodiment of the invention, $R^2$, $R^3$, and $R^4$ represented by formula (3) are the same groups and $R^5$, $R^6$, and $R^7$ are the same groups.

In an embodiment of the invention, the second component is selected from the group consisting of heptyl 3-(3,5-di-tert-butyl-4-hydroxyphenyl)propionate, octyl 3-(3,5-di-tert-butyl-4-hydroxyphenyl)propionate, nonyl 3-(3,5-di-tert-butyl-4-hydroxyphenyl)propionate, hexadecyl 3-(3,5-di-tert-butyl-4-hydroxyphenyl)propionate, heptadecyl 3-(3,5-di-tert-butyl-4-hydroxyphenyl)propionate, and octadecyl 3-(3,5-di-tert-butyl-4-hydroxyphenyl)propionate.

In an embodiment of the invention, the third component is selected from the group consisting of tris(nonylphenyl)phosphite, tris(2,4-di-tert-butylphenyl)phosphite, tridecyl phosphite, triundecyl phosphite, tridodecyl phosphite, and trioctadecyl phosphite.

In an embodiment of the invention, the third component is tris(2,4-di-tert-butylphenyl)phosphite, tridodecyl phosphite, or a combination thereof.

In an embodiment of the invention, based on 100 wt % of the first component, the second component, and the third component, the content of the first component is 3 wt % to 45 wt %, the content of the second component is 20 wt % to 70 wt %, and the content of the third component is 3 wt % to 70 wt %.

In an embodiment of the invention, the first component of the stabilizer is 2,2-bis((3-dodecylthio)-1-oxypropyoxy)methyl)propan-1,3-diylbis(3-(dodecylthio) propionate)), the second component of the stabilizer is octadecyl 3-(3,5-di-tert-butyl-4-hydroxyphenyl)propionate, and the third component of the stabilizer is tris(2,4-di-t-butylphenyl)phosphite.

In an embodiment of the invention, in the stabilizer, based on 100 wt % of the first component, the second component, and the third component, the content of the first component is 28 wt % to 33 wt %, the content of the second component is 58 wt % to 63 wt %, and the content of the third component is 8 wt % to 13 wt %.

The invention further provides a composition. The composition includes a polymer and the stabilizer, wherein based on a content of 100 parts by weight of the polymer, the content of the stabilizer is 0.01 parts by weight to 2.00 parts by weight.

In an embodiment of the invention, the stabilizer is a thermoplastic elastomer (TPE).

In an embodiment of the invention, the polymer is selected from the group consisting of a styrene-butadiene-styrene block copolymer (SBS), a styrene-isoprene-styrene block copolymer (SIS), and a styrene-ethylene-butadiene-styrene block copolymer (SEBS).

In an embodiment of the invention, based on 100 parts by weight of the polymer, the content of the first component of the stabilizer is 0.03 parts by weight to 0.45 parts by weight, the content of the second component of the stabilizer is 0.20 parts by weight to 0.70 parts by weight, and the content of the third component of the stabilizer is 0.03 parts by weight to 0.70 parts by weight.

Based on the above, in the invention, by adding the stabilizer including the first component, the second component, and the third component to a polymer, known issues such as degradation or fading of the polymer can be effectively improved.

To make the above features and advantages of the invention more comprehensible, several embodiments are described in detail as follows.

DESCRIPTION OF THE EMBODIMENTS

The invention provides a stabilizer for a polymer, including a first component, a second component, and a third component. In the following, the individual components of the stabilizer of the invention are described in detail. Moreover, if needed, other additives can also be added to the polymer.

First Component

The first component can be a compound represented by formula (1), and the compound is referred to as 2,2-bis((3-dodecylthio)-1-oxypropyoxy)methyl) propan-1,3-diylbis(3-(dodecylthio)propionate)), formula (1)

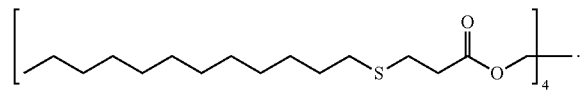

By adding the first component to the stabilizer, the persistence of chemical change resistance of the polymer (such as degradation, fading, or yellowing of the polymer) through the stabilizer can be improved. It should be mentioned that, based on 100 wt % of the first component, the second component, and the third component, the content of the first component can be 3 wt % to 45 wt %, preferably 5 wt % to 40 wt %, and more preferably 7 wt % to 35 wt %. When the content of the first component is less than 3 wt % or greater than 45 wt %, the persistence of chemical change resistance of the polymer is poor through the stabilizer.

Second Component

The second component can be a compound represented by formula (2), formula (2)

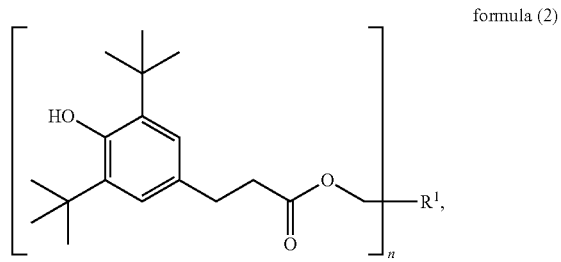

wherein n is 1 or 4, and when n is 1, $R^1$ is a $C_1$-$C_{18}$ alkyl group, and when n is 4, $R^1$ is 2,2-dimethylprop-1,3,1',1''-tetrayl.

When $R^1$ is a $C_1$-$C_{18}$ alkyl group, the alkyl group can be a straight chain or a branch chain alkyl group. Specifically, $R^1$ is, for instance, methyl, ethyl, n-propyl, isopropyl, n-butyl, isobutyl, tertiary butyl, tertiary pentyl, n-pentyl, n-hexyl, n-heptyl, n-octyl, iso-octyl, 2-ethylhexyl, n-nonyl, iso-nonyl, n-decyl, undecyl, dodecyl, tridecyl, branched tridecyl, tetradecyl, pentadecyl, branched pentadecyl, hexadecyl, octadecyl (stearyl group), or a similar group thereof. It should be mentioned that, in formula (2), $R^1$ is preferably selected from the group consisting of $C_7$, $C_8$, $C_9$, $C_{16}$, $C_{17}$, and $C_{18}$ alkyl groups.

Examples of the second component include methyl 3-(3,5-di-tert-butyl-4-hydroxyphenyl)propionate, ethyl 3-(3,5-di-tert-butyl-4-hydroxyphenyl)propionate, propyl 3-(3,5-di-tert-butyl-4-hydroxyphenyl)propionate, butyl 3-(3,5-di-tert-butyl-4-hydroxyphenyl)propionate, pentyl 3-(3,5-di-tert-butyl-4-hydroxyphenyl)propionate, hexyl 3-(3,5-di-tert-butyl-4-hydroxyphenyl)propionate, heptyl 3-(3,5-di-tert-butyl-4-hydroxyphenyl)propionate, octyl 3-(3,5-di-tert-butyl-4-hydroxyphenyl)propionate, nonyl 3-(3,5-di-tert-butyl-4-hydroxyphenyl)propionate, decyl 3-(3,5-di-tert-butyl-4-hydroxyphenyl)propionate, undecyl 3-(3,5-di-tert-butyl-4-hydroxyphenyl)propionate, dodecyl 3-(3,5-di-tert-butyl-4-hydroxyphenyl)propionate, octadecyl 3-(3,5-di-tert-butyl-4-hydroxyphenyl)propionate, or a similar compound thereof, or a combination of the compounds.

The second component is preferably selected from the group consisting of heptyl 3-(3,5-di-tert-butyl-4-hydroxyphenyl)propionate, octyl 3-(3,5-di-tert-butyl-4-hydroxyphenyl)propionate, nonyl 3-(3,5-di-tert-butyl-4-hydroxyphenyl)propionate, hexadecyl 3-(3,5-di-tert-butyl-4-hydroxyphenyl)propionate, heptadecyl 3-(3,5-di-tert-butyl-4-hydroxyphenyl)propionate, and octadecyl 3-(3,5-di-tert-butyl-4-hydroxyphenyl)propionate.

By adding the second component to the stabilizer, the chemical change resistance of the polymer (such as degradation, fading, or yellowing of the polymer) through the stabilizer can be improved, and therefore costs for preparing the stabilizer can be lowered. It should be mentioned that, based on 100 wt % of the first component, the second component, and the third component, the content of the second component can be 20 wt % to 70 wt %, preferably 23 wt % to 67 wt %, and more preferably 25 wt % to 65 wt %.

Third Component

The third component can be a compound represented by formula (3),

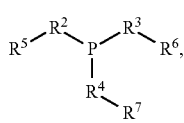

formula (3)

wherein $R^2$, $R^3$, and $R^4$ are each independently a single bond or oxygen, and $R^5$, $R^6$, and $R^7$ are each independently selected from the group consisting of a $C_1$-$C_{18}$ alkyl group, a $C_1$-$C_{18}$ alkyl group having a substituent, a $C_6$-$C_{15}$ aryl group, and a $C_6$-$C_{15}$ aryl group having a substituent.

$R^2$, $R^3$, and $R^4$ can each independently be the same or different groups, for instance, $R^2$ is the same as $R^3$ but is different from $R^4$, $R^2$ is the same as $R^4$ but is different from $R^3$, $R^3$ is the same as $R^4$ but is different from $R^2$, or all three are the same. It should be mentioned that, $R^5$, $R^6$, and $R^7$ are preferably the same groups and $R^2$, $R^3$, and $R^4$ are more preferably oxygen.

When $R^5$, $R^6$, and $R^7$ are each independently selected from a $C_1$-$C_{18}$ alkyl group, the alkyl group can be a straight chain or a branch chain alkyl group. Specifically, $R^5$, $R^6$, and $R^7$ are each independently methyl, ethyl, n-propyl, isopropyl, n-butyl, isobutyl, tertiary butyl, tertiary pentyl, n-pentyl, n-hexyl, n-heptyl, n-octyl, iso-octyl, 2-ethylhexyl, n-nonyl, iso-nonyl, n-decyl, undecyl, dodecyl, tridecyl, branched tridecyl, tetradecyl, pentadecyl, branched pentadecyl, hexadecyl, octadecyl, or a similar group thereof. When $R^5$, $R^6$, and $R^7$ are each independently a $C_1$-$C_{18}$ alkyl group having a substituent, the substituent is a straight chain or a branch chain $C_1$-$C_{18}$ alkyl group or a $C_6$-$C_{15}$ aryl group, wherein the alkyl group and the aryl group are, for instance, the alkyl group and the aryl group described above. It should be mentioned that the substituent can be 1 or more than 1.

When $R^5$, $R^6$, and $R^7$ are each independently a $C_6$-$C_{15}$ aryl group, the aryl group can be a homocyclic aryl group having one or a plurality of condensed rings. Specifically, $R^5$, $R^6$, and $R^7$ are each independently a phenyl group, a naphthyl group, a phenanthryl group, a naphthacenyl group, a fluorenyl group, a pyrenyl group, or a similar group thereof. When $R^5$, $R^6$, and $R^7$ are each independently a $C_6$-$C_{15}$ aryl group having a substituent, the substituent is a straight chain or a branch chain $C_1$-$C_{18}$ alkyl group or a $C_6$-$C_{15}$ aryl group, wherein the alkyl group and the aryl group are, for instance, the alkyl group or the aryl group described above. It should be mentioned that the substituent can be 1 or more than 1.

$R^5$, $R^6$, and $R^7$ can each independently be the same or different groups, for instance, $R^5$ is the same as $R^6$ but is different from $R^7$, $R^5$ is the same as $R^7$ but is different from $R^6$, $R^6$ is the same as $R^7$ but is different from $R^5$, all three are different, or all three are the same. Moreover, $R^5$, $R^6$, and $R^7$ can also be bonded to one another to form a cyclic structure. It should be mentioned that, $R^5$, $R^6$, and $R^7$ are preferably the same groups. Moreover, when $R^2$, $R^3$, and $R^4$ are oxygen and $R^5$, $R^6$, and $R^7$ are $C_1$-$C_{18}$ alkyl groups, $R^5$, $R^6$, and $R^7$ are preferably decyl, undecyl, dodecyl, hexadecyl, heptadecyl, or octadecyl groups. When $R^2$, $R^3$, and $R^4$ are oxygen and $R^5$, $R^6$, and $R^7$ are $C_6$-$C_{15}$ aryl groups having a substituent, $R^5$, $R^6$, and $R^7$ are preferably phenyl groups, wherein the substituent of the phenyl groups is a nonyl group or a tertiary butyl group.

Specific example of the third component include triphenyl phosphite, diphenylalkyl phosphite, phenyldialkyl phosphite, tris(nonylphenyl)phosphite, tridecyl phosphite, triundecyl phosphite, tridodecyl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methyl-phenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butyl-phenoxy)-1,3,2-dioxaphosphirane, or a similar compound thereof, or a combination of the compounds.

The third component is preferably tris(nonylphenyl)phosphite, tris(2,4-di-tert-butylphenyl)phosphite, tridecyl phosphite, triundecyl phosphite, tridodecyl phosphite, trioctadecyl phosphite, or a combination thereof, and is more preferably selected from tris(2,4-di-tert-butylphenyl)phosphite, tridodecyl phosphite, or a combination thereof.

It should be mentioned that tris(2,4-di-tert-butylphenyl) phosphite and tridodecyl phosphite are more resistant to hydrolysis, and the product of the hydrolysis is not an environmental hormone and is therefore more environmentally friendly. Moreover, when applying the stabilizer using tris(2,4-di-tert-butylphenyl)phosphite and tridodecyl phosphite to a polymer, the degree of chemical change resistance of the polymer is higher.

By adding the third component to the stabilizer, the degree of chemical change resistance of the polymer (such as degradation, fading, or yellowing of the polymer) through the stabilizer can be increased. Moreover, based on 100 wt % of the first component, the second component, and the third component, the content of the third component can be 3 wt % to 70 wt %, preferably 5 wt % to 67 wt %, and more preferably 7 wt % to 65 wt %.

It should be mentioned that, when the first component of the stabilizer is 2,2-bis((3-dodecylthio)-1-oxypropyoxy)methyl)propan-1,3-diylbis(3-(dodecylthio) propionate)), the second component is octadecyl 3-(3,5-di-tert-butyl-4-hydroxyphenyl) propionate, and the third component is tris(2,4-di-tert-butylphenyl)phosphite, the efficacy of chemical change resistance of applying the stabilizer to the polymer is particularly good. Moreover, in the stabilizer with the specific components, the most preferred composition ratio is: based on 100 wt % of the first component, the second component, and the third component, the content of the first component is 28 wt % to 33 wt %, the content of the second component is 58 wt % to 63 wt %, and the content of the third component is 8 wt % to 13 wt %.

Additive

The stabilizer of the invention can optionally further include an additive. Specifically, the additive is, for instance, an antioxidant, a UV absorber and a light stabilizer, a metal deactivator, a thiosynergist, a peroxide scavenger, a polyamide stabilizer, a basic costabilizer, a nucleating agent, benzofuranone and indolinone, or other additives for a polymer.

The antioxidant is, for instance, alkylated monophenol, alkylthiomethylphenol, hydroquinone and alkylated hydroquinone, tocopherol, hydroxylated thiodiphenyl ether, alkylidenebisphenol, O-benzyl, N-benzyl, and S-benzyl compounds, hydroxybenzylated malonate, an aromatic hydroxybenzyl compound, a triazine compound, benzylphosphonate, acylaminophenol, an ester of β-(3,5-di-tert-butyl-4-hydroxyphenyl) propionic acid with mono- or polyhydric alcohols, an ester of β-(5-tert-butyl-4-hydroxy-3-methylphenyl)propionic acid with mono- or polyhydric alcohols, an ester of β-(3,5-dicyclohexyl-4-hydroxyphenyl) propionic acid with mono- or polyhydric alcohols, an amide of β-(3,5-di-tert-butyl-4-hydroxyphenyl)propionic acid, ascorbic acid, or an aminic antioxidant.

Examples of alkylated monophenol include 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenol, 2,6-di-nonyl-4-methylphenol, 2,4-dimethyl-6-(1'-methylundec-1'-yl) phenol, 2,4-dimethyl-6-(1'-methylheptadec-1'-yl) phenol and 2,4-dimethyl-6-(1'-methyltridec-1'-yl)phenol, or a combination of the compounds.

Examples of alkylthiomethylphenol include 2,4-dioctylthiomethyl-6-tert-butylphenol, 2,4-dioctylthiomethyl-6-ethylphenol, 2,6-di-dodecylthiomethyl-4-nonylphenol, or a combination of the compounds.

Examples of hydroquinone and alkylated hydroquinone include 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate, or a combination of the compounds.

Examples of tocopherol include α-tocopherol, β-tocopherol, γ-tocopherol, δ-tocopherol, vitamin E, or a combination of the compounds.

Examples of hydroxylated thiodiphenyl ether include 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide, or a combination of the compounds.

Examples of alkylidenebisphenol include 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'(tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]-terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane, or a combination of the compounds.

Examples of the O-, N- and S-benzyl compounds include 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxy-benzyl)amine, bis(4-tert-butyl-3-hydroxy-2,6-dimethylbenzyl)dithioterephthalate, bis (3,5-di-tert-butyl-4-hydroxybenzyl)sulfide, isooctyl-3,5-di-tert-butyl-4-hydroxybenzyl-mercaptoacetate, or a combination of the compounds.

Examples of hydroxybenzylated malonate include di-octadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, or a combination of the compounds.

Examples of the aromatic hydroxybenzyl compound include 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, or a combination of the compounds.

Examples of the triazine compound include 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxy-phenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate, or a combination of the compounds.

Examples of benzylphosphonate include dimethyl-2,5-di-tert-butyl-4-hydroxybenzyl-phosphonate, diethyl-3,5-di-tert-butyl-4-hydroxybenzylphosphonate, dioctadecyl 3,5-di-tert-butyl-4-hydroxybenzylphosphonate, dioctadecyl-5-tert-butyl-4-hydroxy-3-methyl-benzylphosphonate, the calcium salt of the monoethyl ester of 3,5-di-tert-butyl-4-hydroxybenzylphosphonic acid, or a combination of the compounds.

Examples of acylaminophenol include 4-hydroxyauranilide, 4-hydroxystearanilide, octyl N-(3,5-di-tert-butyl-4-hydroxyphenyl)carbamate, or a combination of the compounds.

An ester of β-(3,5-di-tert-butyl-4-hydroxyphenyl)propionic acid with a mono- or poly-hydric alcohol, wherein examples of the alcohol include 1,6-hexanediol, 1,9-nonanediol, ethylene glycol, 1,2-propanediol, neopentyl glycol, thiodiethylene glycol, diethylene glycol, methylene glycol, tris(hydroxyethyl)isocyanurate, N,N'-bis(hydroxyethyl)oxamide, 3-thiaundecanol, 3-thiapentadecanol, trimethylhexanediol, trimethylol-propane and 4-hydroxymethyl-1-phospha-2,6,7-trioxabicyclo[2.2.2]octane, or a combination of the compounds.

An ester of β-(5-tert-butyl-4-hydroxy-3-methylphenyl) propionic acid with a mono- or polyhydric alcohol, wherein examples of the alcohol include methanol, ethanol, n-octanol, i-octanol, octa-decanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl) propionyloxy}-1,1-dimethylethyl]-2,4,8,10-tetraoxaspiro[5.5]undecane, or a combination of the compounds.

An ester of β-(3,5-dicyclohexyl-4-hydroxyphenyl)propionic acid with a mono- or polyhydric alcohol, wherein examples of the alcohol include methanol, ethanol, octanol, octadecanol, 1,6-hexanediol, 1,9-nonanediol, ethylene glycol, 1,2-propanediol, neopentyl glycol, thiodiethylene glycol, diethylene glycol, methylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, or a combination of the compounds.

An ester of 3,5-di-tert-butyl-4-hydroxyphenyl acetic acid with a mono- or polyhydric alcohol, wherein examples of the alcohol include methanol, ethanol, octanol, octadecanol, 1,6-hexanediol, 1,9-nonanediol, ethylene glycol, 1,2-propanediol, neopentyl glycol, thiodiethylene glycol, diethylene glycol, thethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]-octane, or a combination of the compounds.

Examples of the amide of β-(3,5-di-tert-butyl-4-hydroxyphenyl)propionic acid include N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]-propionyloxy)ethyl]oxamide (Naugard XL-1), (RTM, made by Uniroyal), or a combination of the compounds.

Examples of ascorbic acid include vitamin C.

Examples of the aminic antioxidant include N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylene-diamine, N,N'-bis(2-naphthyl)-p-phenylenediamine, N-isopropyl-N'-phenyl-p-phenylenediamine, N-(1,3-dimethylbutyl)-N-phenyl-p-phenylenediamine, N-(1-methyl-heptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylene-diamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine (such as p,p'-di-tert-octyldiphenylamine), 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methyl-phenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated ferf-butyl/ferf-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated ferf-octyl-phenothiazines, N-allylphenothiazine, N,N,N,N'-tetraphenyl-1,4-diaminobut-2-ene, or a combination of the compounds.

The UV absorber and the light stabilizer are, for instance, 2-(T-hydroxyphenyl)benzotriazole, 2-hydroxybenzophenone, an ester of substituted and unsubstituted benzoic acid, acrylate, a nickel compound, sterically hindered amine, oxamide, or 2-(2-hydroxyphenyl)-1,3,5-triazine.

Examples of benzotriazole include 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)-phenyl)-5-chloro-benzotriazole, 2-(3'-tert-butyl-2'-hydroxy-5'-(2-methoxycarbonylethyl)-phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxyl)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol], the transesterification product of 2-[3'-tert-butyl-5'-(2-methoxymethylene)-2'-hydroxyphenyl]-2H-benzotriazole with polyethylene glycol 300,

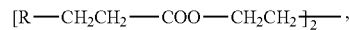

wherein R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole, or a combination of the compounds.

Examples of 2-hydroxybenzophenone include 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives, or a combination of the compounds.

Examples of the ester of substituted and unsubstituted benzoic acid include 4-tert-butyl-phenylsalicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate, or a combination of the compounds.

Examples of acrylate include ethyl α-cyano-β,β-diphenylacrylate, isooctyl α-cyano-β,β-diphenylacrylate, methyl α-carbomethoxycinnamate, methyl α-cyano-β-methyl-β-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate), or a combination of the compounds.

Examples of the nickel compound include nickel complexes of 2,2'-thio-bis[4-(1,1,3,3-tetramethylbutyl)phenol], such as the 1:1 or 1:2 complex, with or without other ligands, such as n-butylamine, triethanolamine, or N-cyclohexyldiethanolamine, nickel dibutyldithiocarbamate, nickel salts of a monoalkyl ester (such as methyl or ethyl ester), 4-hydroxy-3,5-di-tert-butylbenzylphosphonic acid, nickel complexes of ketoxime (such as 2-hydroxy-4-methylphenylundecylketoxime), nickel complexes of 1-phenyl-4-lauroyl-5-hydroxypyrazole, with or without other ligands, or a combination of the compounds.

Examples of sterically hindered amine include bis-[2,2,6,6-tetramethyl-1-(undecyloxy)-piperidine-4-yl]carbonate, bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, a condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethyl-piperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butyl amino-2,2,6,6-tetramethylpiperidyl)-1,3,5-triazine and 1,2-bis(3-aminopropyl-amino)ethane, the condensate of 2-chloro-4,6-di-(4-n-butylamino-1,2,2,6,6-penta-methylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-penta-methyl-4-piperidyl)pyrrolidine-2,5-dione, a mixture of 4-hexadecyloxy-2,2,6,6-tetramethylpiperidine and 4-stearyloxy-2,2,6,6-tetramethylpiperidine, a condensate of N,N'-bis(2,2,6,6-tetramethyl-4-piperidyl)-hexamethylenediamine and 4-cyclohexylamino-2,6-dichloro-1,3,5-triazine, a condensate of 1,2-bis(3-aminopropylamino)ethane, 2,4,6-trichloro-1,3,5-triazine, and 4-butylamino-2,2,6,6-tetramethylpiperidine (CAS Reg. No. [136504-96-6]), a condensate of 1,6-hexanediamine and 2,4,6-trichloro-1,3,5-triazine and N,N-dibutyl-amine and 4-butylamino-2,2,6,6-tetramethylpiperidine (CAS Reg. No. [192268-64-7]), N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4.5]decane, a reaction product of 7,7,9,9-tetramethyl-2-cycloundecyl-1-oxa-3,8-diaza-4-oxospiro-[4.5]decane and epichlorohydrin, 1,1-bis(1,2,2,6,6-pentamethyl-4-piperidyloxycarbonyl)-2-(4-methoxyphenyl)ethene, N,N-bisformyl-N,N-bis(2,2,6,6-tetramethyl-4-piperidyl)hexamethylenediamine, a diester of 4-methoxymethylene-malonic acid with 1,2,2,6,6-pentamethyl-4-hydroxypiperidine, poly [methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-penta-methyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (RTM, Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine, or a combination of the compounds.

Examples of oxamide includes 4,4'-dioctyloxyoxanilide, 2,2'-diethoxyoxanilide, 2,2'-dioctyloxy-5,5'-di-tert-butoxanilide, 2,2'-didodecyloxy-5,5'-di-ferf-butoxanilide, 2-ethoxy-2'-ethyloxanilide, N,N'-bis(3-dimethylaminopropyl)oxamide, 2-ethoxy-5-tert-butyl-2'-ethoxanilide and a mixture thereof with 2-ethoxy-2'-ethyl-5,4'-di-tert-butoxanilide, a mixture of o-methoxy-disubstituted oxanilide and p-methoxy-disubstituted oxanilide and a mixture of o-ethoxy-disubstituted oxanilide and p-ethoxy-disubstituted oxanilide, or a combination of the compounds.

Examples of 2-(2-hydroxyphenyl)-1,3,5-triazine include 2,4,6-tris(2-hydroxy-4-octyloxyphenyl)-1,3,5-triazine, 2-(2-hydroxy-4-octyloxyphenyl)-4,6-bis(2,4-dimethyl-phenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine, or a combination of the compounds.

Examples of the metal deactivator include N,N'-diphenyloxamide, N-salicylal-N'-salicyloyl hydrazine, N,N'-bis(salicyloyl)hydrazine, N,N'-bis(3,5-di-tert-butyl-4-hydroxyphenyl-propionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)-thiopropionyl dihydrazide, or a similar compound thereof, or a combination of the compounds.

Examples of thiosynergist include dimyristyl thiodipropionate, ditridecyl thiodipropionate, distearyl disulfide, or a similar compound thereof, or a combination of the compounds.

Examples of the peroxide scavenger include mercaptobenzimidazole, zinc salt of 2-mercaptobenzimidazole, zinc dibutyldithiocarbamate, or a similar compound thereof, or a combination of the compounds.

Examples of the basic costabilizer include melamine, polyvinylpyrrolidone, dicyandiamide, triallyl cyanurate, urea derivative, hydrazine derivative, amine, polyamide, polyurethane, alkali metal salt and alkaline earth metal salt of higher fatty acid (such as calcium stearate, zinc stearate, magnesium behenate, magnesium stearate, sodium ricinoleate, potassium palmitate, antimony pyrocatecholate, and zinc pyrocatecholate), or a similar compound thereof, or a combination of the compounds.

Examples of the nucleating agent include an inorganic substance such as talcum, metal oxide (such as titanium dioxide or magnesium oxide), phosphate, carbonate, or sulfate of an alkaline earth metal, an organic compound such as monocarboxylic acid or polycarboxylic acid and a salt thereof such as polycarboxylic acid, adipic acid, diphenylacetic acid, sodium succinate, or sodium benzoate, a polymer such as an ionic copolymer, or a similar compound thereof, or a combination of the compounds.

Examples of the filler and the enhancer include calcium carbonate, silicate, glass fibre, asbestos, talc, kaolin, mica, barium sulfate, metal oxide and hydroxide, carbon black, graphite, wood flour, fibre of other natural products, synthetic fibre or a similar compound thereof, or a combination of the compounds.

Examples of benzofuranone and indolinone include 3-[4-(2-acetoxyethoxy)phenyl]-5,7-di-tert-butylbenzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxy-ethoxy]phenyl)benzofuran-2-one], 5,7-di-tert-butyl-3-(4-ethoxyphenyl)benzofuran-2-one, 3-(4-acetoxy-3, 5-dimethylphenyl)-5,7-di-tert-butylbenzofuran-2-one, dimethyl-4-pivaloyloxyphenyl)-5,7-di-tert-butylbenzofuran-2-one, 3-(3,4-dimethyl-phenyl)-5,7-di-tert-butylbenzofuran-2-one, 3-(2,3-dimethylphenyl)-5,7-di-ferf-butyl-benzofuran-2-one, 3-(2-acetyl-5-isooctylphenyl)-5-isooctylbenzofuran-2-one, or a combination of the compounds.

Examples of other additives for a polymer include a pigment (such as titanium dioxide of rutile or anatase forms), color pigment, plasticiser, lubricant, emulsifier, rheology additive, antislip/antiblock additive, catalyst, flow-control agent, optical brightener, antistatic agent, blowing agent, or a combination of the other additives for a polymer.

The stabilizer and the various additives can be used alone or in combination and can be added to a polymer to increase the degree of chemical change resistance and the persistence of chemical change resistance of the polymer.

Polymer

Polymers that can be added to the stabilizer include polyolefin, a mixture of polyolefins, a olefin copolymer, a hydrocarbon resin, an aromatic resin, a homopolymer and a copolymer derived from a vinyl aromatic monomer, a graft copolymer of a vinyl aromatic monomer of styrene or α-methylstyrene, a halogen-containing polymer, a copolymer derived from α,β-unsaturated acid or derivatives thereof, a copolymer of unsaturated monomer, a polymer derived from unsaturated alcohol and amine or acyl derivatives thereof or acetal, a homopolymer and a copolymer of cyclic ether, polyacetal, polyether, polyurethane, polyamide and copolyamide, a nitrogen-containing polymer, polyester, polycarbonate and polyester/carbonate, polyketone, a sulfur-containing polymer, a nitrogen-containing crosslinked polymer, drying and non-drying alkyd resins, an unsaturated polyester resin, a crosslinkable acrylic resin, a crosslinked epoxy resin, a natural polymer, polyblend, or a combination of the compounds. Examples of the various polymers are described in detail below:

1. Examples of polyolefin include polypropylene, polyisobutylene, polybut-1-ene, poly-4-methylpent-1-ene, polyvinylcyclohexane, polyisoprene or polybutadiene, polymers of cycloolefins (such as polymers of cyclopentene or norbornene), polyethylene (such as high density poly-ethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) or (ULDPE)), or a combination of the compounds.

2. Examples of the mixture of polyolefins include a mixture of polypropylene and polyisobutylene, a mixture of polypropylene and polyethylene (such as PP/HDPE and PP/LDPE), or a mixture of different types of polyethylene (such as LDPE/HDPE).

3. Examples of the olefin copolymer include, for instance, ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (such as ethylene/norbornene such as COC), ethylene/1-olefins copolymers (wherein the 1-olefin is generated in-situ), propylene/butadiene copolymers, isobutylene/isoprene copolymers, isobutylene/isopentene, ethylene/vinylcyclohexene copolymers, ethylene/alkyl acrylate copolymers, ethylene/alkyl methacrylate copolymers, ethylene/vinyl acetate copolymers, ethylene/acrylic acid copolymers and salts thereof (ionomers), terpolymers of ethylene with propylene and a diene (such as hexadiene, dicyclopentadiene, or ethylidene-norbornene), a mixture of the copolymers or a mixture of the polyolefins (such as polypropylene/ethylene-propylene copolymers, LDPE/ethylene-vinyl acetate copolymers (EVA), LDPE/ethylene-acrylic acid copolymers (EAA), LLDPE/EVA, LLDPE/EAA, alternating polyalkylene/carbon monoxide copolymers, random polyalkylene/carbon monoxide copolymers, or a mixture of random polyalkylene with other polymers (such as polyamides).

4. Examples of the hydrocarbon resin (such as $C_5$-$C_9$) include hydrogenated modifications thereof (such as tackifiers) and a mixture of polyalkylene and starch.

5. Examples of the aromatic resin include polystyrene, poly(p-methylstyrene), or polymethylstyrene.

6. An aromatic homopolymer and a copolymer derived from a vinyl aromatic monomer, wherein examples of aromatic groups derived from a vinyl aromatic monomer include styrene, α-methylstyrene, all isomers of vinyl toluene (especially p-vinyltoluene), all isomers of ethyl styrene, propyl styrene, vinyl biphenyl, vinyl naphthalene, and all isomers of vinyl anthracene or a mixture thereof, or a combination of the polymers. It should be mentioned that, the aromatic homopolymer and the copolymer derived from the vinyl aromatic monomer can also be:

(i) a vinyl aromatic monomer and a copolymer selected from the group consisting of ethylene, propylene, diene, nitrile, acid, maleic anhydride, maleimide, vinyl acetate, and vinyl chloride or an acrylic derivative and a mixture thereof. Specifically, the copolymer is, for instance, styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, or styrene/acrylonitrile/methyl acrylate;

(ii) a mixture of styrene copolymer and another polymer, wherein the other polymer is, for instance, polyacrylate, a diene polymer, or an ethylene/propylene/diene terpolymer;

(iii) a random copolymer of styrene (such as styrene-butadiene-styrene random copolymer, (S-SBR));

(iv) a block copolymer of styrene (thermoplastic elastomers (TPE) such as a styrene-butadiene-styrene block copolymer (SBS), a styrene-isoprene-styrene block copolymer (SIS), a styrene-ethylene-butadiene-styrene block copolymer (SEBS), a styrene-ethylene-butylene-styrene block copolymer, or a styrene-ethylene-propylene-styrene block copolymer), or a combination of the polymers.

(v) an aromatic homopolymer derived from the vinyl aromatic monomer and the hydrogenated aromatic polymer derived from hydrogenation of the copolymers of 6, such as polycyclohexylethylene (PCHE) (also referred to as polyvinylcyclohexane (PVCH)) prepared by hydrogenating atactic polystyrene.

7. Examples of the graft copolymer of the vinyl aromatic monomer of styrene or α-methylstyrene include styrene on polybutadiene, styrene on polybutadiene-styrene copolymer or polybutadiene-acrylonitrile copolymer; styrene or acrylonitrile (or methacrylonitrile) on polybutadiene; styrene, acrylonitrile, or methyl methacrylate on polybutadiene; styrene or maleic anhydride on polybutadiene; styrene, acrylonitrile, or maleic anhydride or maleimide on polybutadiene; styrene or maleimide on polybutadiene; styrene or alkyl acrylate or methacrylate on polybutadiene; styrene or acrylonitrile on ethylene/propylene/diene terpolymer; styrene or acrylonitrile on polyalkyi acrylate or polyalkyi methacrylate, styrene or acrylonitrile on acrylate/butadiene copolymer, or a combination of the copolymers.

8. Examples of the halogen-containing polymer include polychloroprene, chlorinated rubber, chlorinated or brominated copolymer (halobutyl rubber) of isobutylene-isoprene, chlorinated or sulfochlorinated polyethylene, a copolymer of ethylene or chlorinated ethylene, an epichlorohydrin homo- or copolymer, a polymer of a halogen-containing vinyl compound (such as polyvinyl chloride, polyvinylidene chloride, polyvinyl fluoride), polyvinylidene fluoride or copolymers thereof (such as vinyl chloride/vinylidene chloride, vinyl chloride/vinyl acetate, or vinylidene chloride/vinyl acetate copolymers), or a combination of the compounds.

9. Examples of the polymer derived from α,β-unsaturated acid or derivatives thereof include poly-acrylate and polymethacrylate, polymethyl methacrylate, polyacrylamide or poly-acrylonitrile, impact-modified with butyl acrylate, or a combination of the polymers.

10. Examples of the copolymer of an unsaturated monomer include an acrylonitrile/butadiene copolymer, an acrylonitrile/alkyl acrylate copolymer, acrylonitrile/alkoxyalkyl acrylate or an acrylonitrile/vinyl halide copolymer, an acrylonitrile/alkyl methacrylate/butadiene terpolymer, or a combination of the copolymers.

11. Examples of the polymer derived from unsaturated alcohol and amines or the acyl derivatives or acetals thereof include polyvinyl alcohol, polyvinyl acetate, polyvinyl stearate, polyvinyl benzoate, polyvinyl maleate, polyvinyl butyral, polyallyl phthalate or polyallyl melamine; a copolymer thereof with the polyolefins, or a combination of the polymers.

12. Examples of the homopolymer and the copolymer of cyclic ether include polyalkylene glycol, polyethylene oxide, polypropylene oxide, a copolymer thereof with bisglycidyl ether, or a combination of the copolymers.

13. Examples of polyacetal include polyoxymethylene, polyoxymethylene containing ethylene oxide as a comonomer, polyacetal modified with thermoplastic polyurethane, acrylate, or MBS, or a combination of the copolymers.

14. Examples of polyether include polyphenylene oxide, polyphenylene sulfide, a polymer of polyphenylene oxide and styrene or a mixture of polyamides, or a combination of the copolymers.

15. Examples of polyurethane include polyurethane derived from hydroxy-terminated polyether, polyester, or polybutadiene on the one hand and aliphatic or aromatic polyisocyanate on the other, or a precursor thereof.

16. Polyamide and copolyamide formed from the reaction of diamine and dicarboxylic acid and/or from aminocarboxylic acid or the corresponding lactam. Examples of polyamide and copolyamide include polyamide 4, polyamide 6, polyamide 6/6, 6/10, 6/9, 6/12, 4/6, 12/12, polyamide 11, polyamide 12, aromatic polyamide starting from m-xylene diamine and adipic acid; polyamide prepared from hexamethylenediamine and isophthalic or/and terephthalic acid and with or without an elastomer as modifier (such as poly-2,4,4,-trimethylhexamethylene terephthalamide or poly-m-phenylene isophthalamide), or a block copolymer of the polyamides with polyolefins, olefin copolymers, ionomers, or chemically bonded or grafted elastomers, and a copolymer with polyether (such as a block polymer with polyethylene glycol, polypropylene glycol, or polytetramethylene glycol), polyamide or copolyamide modified with EPDM or ABS, and polyamide (RIM polyamide system) condensed during processing, or a combination of the copolymers.

17. Examples of the nitrogen-containing polymer include polyurea, polyimide, polyamide-imide, polyetherimide, polyesterimide, polyhydantoin, polybenzimidazole, or a combination of the copolymers.

18. Polyester formed from the reaction of dicarboxylic acid and diol and/or from the reaction of hydroxycarboxylic acid or the corresponding lactone or lactide. Examples of polyester include polyethylene terephthalate, polybutylene terephthalate, poly-1,4-dimethylolcyclohexane terephthalate, polyalkylene naphthalate, polyhydroxybenzoate, copolyether ester derived from hydroxy-terminated polyether, polyester modified with polycarbonate or MBS, or a combination of the copolymers.

Examples of copolyester include polybutylenesuccinate/terephthalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer, or a similar compound thereof. Examples of aliphatic polyester include poly(hydroxyalkanoates), poly(propiolactone), poly(butyrolactone), poly(pivalolactone), poly(valerolactone), poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutylene oxalate, polyhexamethyleneoxalate, polyethylenesebacate, polypropylenesebacate, polybutylenesebacate and polylactic acid (PLA) or a corresponding polyester modified with polycarbonate or MBS, or a similar compound thereof.

19. Polycarbonate or polyester/carbonate.

20. Polyketone.

21. Examples of the sulfur-containing polymer include polysulfone, polyether sulfone, polyether ketone, or a similar compound thereof.

22. Examples of the nitrogen-containing crosslinked polymer include phenol/formaldehyde resins, urea/formaldehyde resins, melamine/formaldehyde resins, alkyd resin, polyester resin, an acrylate resin crosslinked with melamine resin, urea resin, isocyanate, isocyanurate, polyisocyanate or epoxy resin, or a similar compound thereof.

23. Drying and non-drying alkyd resins.

24. Unsaturated polyester resin derived from copolyesters of saturated and unsaturated dicarboxylic acids with polyhydric alcohol and a vinyl compound as a crosslinking agent, and also halogen-containing modifications thereof of low flammability, or a similar compound thereof.

25. Examples of the crosslinkable acrylic resin include epoxy acrylate, urethane acrylate, polyester acrylate, or a similar compound thereof.

26. Crosslinked epoxy resin derived from an aliphatic, cycloaliphatic, heterocyclic, or aromatic glycidyl compound. Examples of the crosslinked epoxy resin include products of diglycidyl ethers of bisphenol A and bisphenol F, or a similar compound thereof.

27. Examples of the natural polymer include cellulose, rubber, gelatin, or chemically modified homologous derivatives thereof (such as cellulose acetate, cellulose propionate, and cellulose butyrate, or cellulose ether such as methyl cellulose), rosins or derivatives thereof, or a similar product thereof.

28. Polyblend as a blend of polymers. Examples of the polyblend include PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylate, POM/thermoplastic PUR, PC/thermoplastic PUR, POM/acrylate, POM/MBS, PPO/HIPS, PPO/PA 6.6 and a copolymer, PA/HDPE, PA/PP, PA/PPO, PBT/PC/ABS, PBT/PET/PC, or a similar compound thereof.

It should be mentioned that, when the stabilizer is applied in a thermoplastic elastomer (a polymer), the stabilizer can sufficiently exert the efficacy of making the degree of chemical change resistance of the polymer better and increasing the persistence of chemical change resistance of the polymer. The thermoplastic elastomer includes the mixture of polyolefins, the block copolymer of styrene, the polyurethane, the copolyester, or the polyamide above. It should be mentioned that, in the invention, the thermoplastic elastomer (polymer) is preferably SBS, SIS, SEBS, or a combination thereof.

Based on a content of 100 parts by weight of the polymer, the content of the stabilizer is 0.01 parts by weight to 2.00 parts by weight. Preferably, the content of the stabilizer is 0.1 parts by weight to 1.50 parts by weight. More preferably, the content of the stabilizer is 0.4 parts by weight to 1.20 parts by weight.

Moreover, based on a content of 100 parts by weight of the polymer, the content of the first component of the stabilizer is 0.03 parts by weight to 0.45 parts by weight, the content of the second component of the stabilizer is 0.20 parts by weight to 0.70 parts by weight, and the content of the third component of the stabilizer is 0.03 parts by weight to 0.70 parts by weight. Preferably, the content of the first component can be 0.05 parts by weight to 0.40 parts by weight, the content of the second component can be 0.23 parts by weight to 0.67 parts by weight, and the content of the third component can be 0.05 parts by weight to 0.67 parts by weight. More preferably, the content of the first component can be 0.07 parts by weight to 0.35 parts by weight, the content of the second component can be 0.25 parts by weight to 0.65 parts by weight, and the content of the third component can be 0.07 parts by weight to 0.65 parts by weight.

The invention further provides a composition including the polymer and the stabilizer described above. The preparation method of the composition is as follows:

First, the first component, the second component, and the third component are added to a solvent and uniformly mixed to a solution state, and a solution containing the stabilizer can be obtained. When necessary, an additive can also be added. It should be mentioned that, the solvent is an organic solvent (such as cyclohexane) that can dissolve the first component, the second component, the third component, and the polymer but does not react with the first component, the second component, the third component, and the polymer.

Then, the solution containing the stabilizer is added to a solution in which the polymer is dissolved, and a solution (composition) containing the stabilizer and the polymer can be formed. It should be mentioned that, the solvent used to dissolve the polymer and the solvent used to dissolve the stabilizer are the same to ensure the stabilizer can be sufficiently dispersed in the solution.

The composition can be treated with various processes (such as compression molding, injection molding, extrusion, and rotational molding . . . etc.) to form various products.

EMBODIMENTS

Embodiment 1

First, 0.150 parts by weight of 2,2-bis((3-dodecylthio)-1-oxypropyoxy)methyl) propan-1,3-diylbis(3-(dodecylthio) propionate)), 0.300 parts by weight of octadecyl 3-(3,5-di-tert-butyl-4-hydroxyphenyl)propionate, and 0.050 parts by weight of tris(2,4-di-tert-butylphenyl)phosphite are dissolved in cyclohexane to form a solution containing a stabilizer.

Then, 100 parts by weight of SBS is dissolved in cyclohexane to form a solution containing a polymer. Next, the solution containing the stabilizer is added to the solution containing the polymer and the mixture is uniformly mixed at room temperature to form a solution containing the polymer and the stabilizer. Then, the solution containing the polymer and the stabilizer is slowly poured into preheated deionized water (700 parts by weight, preheat temperature of 90° C. to 95° C.), and the mixture is heated and stirred to obtain a polymer lump. Next, the polymer lump is extruded using a two-roll mill at room temperature to remove water. Then, the polymer lump is rolled for 3 minutes at 130° C. using the two-roll mill to obtain a polymer thin sheet. Next, the polymer thin sheet is hot pressed for 5 minutes at 150° C. using a press machine to obtain a polymer test strip of embodiment 1 having a thickness of 1 millimeter.

Embodiment 2 to Embodiment 9

The polymer test strip of each of embodiment 2 to embodiment 9 is prepared using the same steps as embodiment 1, with the difference being: the type of the ingredients and the usage amount thereof are changed (as shown in Table 2), wherein the compounds corresponding to the labels (A-1, B-1, B-2, C-1, C-2, and C-3) of Table 2 are as shown in Table 1.

Comparative Example 1

One hundred parts by weight of SBS is dissolved in cyclohexane to form a solution containing a polymer. Then, the solution containing the polymer is slowly poured into preheated deionized water (700 parts by weight, preheat temperature of 90° C. to 95° C.), and the mixture is heated and stirred to obtain a polymer lump. Next, the polymer lump is extruded using a two-roll mill at room temperature to remove water. Then, the polymer lump is rolled for 2 minutes at 110° C. using the two-roll mill to obtain a polymer thin sheet. Next, the polymer sheet is hot pressed for 5 minutes at 120° C. using a press machine to obtain a polymer test strip (blank test strip) of comparative example 1 having a thickness of 1 millimeter.

Comparative Example 2 to Comparative Example 4

The polymer test strip of each of comparative example 2 to comparative example 4 is prepared using the same steps as embodiment 1, with the difference being: the type of the ingredients and the usage amount thereof are changed (as shown in Table 3), wherein the compounds corresponding to the labels (A-1, B-1, B-2, C-1, C-2, and C-3) of Table 3 are as shown in Table 1.

[Evaluation of Yellow Index]

The yellow index is measured according to the specifications of ASTM E313 (specifications of American Society for Tests and Materials). The lower the yellow index, the lower the degree of yellowing of the polymer test strip, indicating the stabilizer can effectively raise the degree of chemical change resistance (degradation, fading, or yellowing) of the polymer. On the other hand, the higher the yellow index, the higher the degree of yellowing of the polymer test strip, indicating the chemical change resistance of the polymer is poor (that is, the polymer is degraded). The measurement method of the yellow index is as follows:

First, the initial yellow index ($YI_0$) of each of the polymer test strips of embodiments 1 to 10 and comparative example 1 to comparative example 4 is measured using a color meter. Then, the polymer test strip is placed in an oven at 160° C. for 2 hours and 3 hours, and the yellow indices are measured using the color meter. Moreover, the yellow indices of each of the polymer test strips of embodiment 1 to embodiment 9 and comparative example 1 to comparative example 4 are evaluated, and the results thereof are as shown in Table 2 and Table 3.

[Evaluation Results]

Table 2 and Table 3 show the initial yellow index ($YI_0$), the yellow index (YI(160° C., 2 hours)), and the yellow index (YI(160° C., 3 hours)) of the polymer test strip of each embodiment and each comparative example. The experimental results show that, the longer the polymer test strip is placed in the oven (160° C.), the higher the yellow indices. In other words, the polymer degrades at high temperature, and the yellow indices increases accordingly.

The polymer test strip of comparative example 1 without any stabilizers is compared to the polymer test strip of each of embodiment 1 to embodiment 9 and comparative example 2 to comparative example 4 containing a stabilizer. The yellow indices ($YI_0$, YI(160° C., 2 hours) and YI(160° C., 3 hours)) of comparative example 1 are significantly higher than those of embodiment 1 to embodiment 9 and comparative example 2 to comparative example 4. In other words, by adding the stabilizer to the polymers, the yellow indices of the polymers can be effectively lowered, thereby raising the degree of chemical change resistance of the polymers.

Comparative example 2 to comparative example 4 and embodiment 1 to embodiment 9 are compared. The stabilizer of each of comparative example 2 to comparative example 4 only contains the second component (B-1) and the third component (C-1) and does not contain the first component (A-1).

In comparison, the stabilizer of each of embodiment 1 to embodiment 9 contains all of the first component (A-1), the second component (B-1 or B-2), and the third component (C-1, C-2, or C-3). The experimental results show that, the yellow indices ($YI_0$, YI(160° C., 2 hours), and YI(160° C., 3 hours)) of the polymer test strip of each of embodiment 1 to embodiment 9 are significantly lower than those of comparative example 2 to comparative example 4. In other words, by adding the stabilizer having all of the first component, the second component, and the third component to a polymer, the yellow indices of the polymer can be effectively lowered, thereby raising the degree of chemical change resistance of the polymer.

Moreover, the tris(nonylphenyl)phosphite (C-1) used in each of comparative example 2 to comparative example 4 is not resistant to hydrolysis, and the product nonylphenol of the hydrolysis of tris(nonylphenyl)phosphite is an environmental hormone that generates interference to the biological endocrine system and is therefore not environmentally friendly. By comparison, the tris(2,4-di-tert-butylphenyl)phosphite (C-2) and the tris-dodecyl-phosphite (C-3) used in each of embodiment 1 to embodiment 9 are more resistant to hydrolysis, and the product of the hydrolysis is not an environmental hormone and is therefore more environmentally friendly. It should be further mentioned that, the degree of chemical change resistance of each of embodiment 1 to embodiment 9 using tris(2,4-di-tert-butylphenyl)phosphite (C-2) and tris-dodecyl-phosphite (C-3) is also higher than that of each of comparative example 2 to comparative example 4 using tris (nonylphenyl)phosphite (C-1). Therefore, using tris(2,4-di-tert-butylphenyl)phosphite (C-2) and tris-dodecyl-phosphite (C-3) as the third component is apparently better than using tris(nonylphenyl)phosphite (C-1).

In embodiment 1 to embodiment 3, the ratio of the usage amount (that is, the total amount of the first component, the second component, and the third component) of the stabilizer is 2:3:4. Moreover, embodiment 4 to embodiment 6 and embodiment 7 to embodiment 9 are respectively viewed as a group, wherein the ratio of the usage amount of the stabilizer is also 2:3:4. The experimental results show that, the greater the usage amount of the stabilizer, the lower the yellow indices of the polymer test strip. In other words, the greater the amount of the stabilizer in the polymer, the higher the degree of chemical change resistance of the polymer.

In embodiment 1 to embodiment 3, the first component of the stabilizer is 2,2-bis((3-dodecylthio)-1-oxypropyoxy)methyl)propan-1,3-diylbis(3-(dodecylthio) propionate)), the second component of the stabilizer is octadecyl 3-(3,5-di-tert-butyl-4-hydroxyphenyl)propionate, and the third component of the stabilizer is tris(2,4-di-tert-butylphenyl)phosphite. The experimental results show that, the yellow indices of the polymer test strips are lower. In other words, by adding a stabilizer having the specific components in a polymer, the degree of chemical change resistance of the polymer is higher. Moreover, the ratio of the first component, the second component, and the third component of the stabilizer is 3:6:1. In embodiment 4 to embodiment 6, the ratio of the first component, the second component, and the third component of the stabilizer is 1:3:6. The experimental results show that, the yellow indices of each of embodiment 1 to embodiment 3 are lower than the yellow indices of comparative example 4 to comparative example 6. In other words, when the ratio of the first component, the second component, and the third component of the stabilizer is 3:6:1, the yellow indices of the polymer test strips are lower. In other words, by adding a stabilizer having the specific ratio in the polymer, the degree of chemical change resistance of the polymer is higher. In other words, embodiment 1 to embodiment 3 are the preferred embodiments of the present application.

In embodiment 1 to embodiment 3 and embodiment 7 to embodiment 9, the second component of the stabilizer contains octadecyl 3-(3,5-di-tert-butyl-4-hydroxyphenyl)propionate (B-1). In comparison, the second component of the stabilizer of each of embodiment 4 to embodiment 6 does not contain octadecyl 3-(3,5-di-tert-butyl-4-hydroxyphenyl)propionate (B-1). The experimental results show that, the yellow indices of each of embodiment 1 to embodiment 3 and embodiment 7 to embodiment 9 are lower than the yellow indices of comparative example 4 to comparative example 6. In other words, by adding the stabilizer containing octadecyl 3-(3,5-di-tert-butyl-4-hydroxyphenyl)propionate (B-1) to a polymer, the yellow indices of the polymer are lower (that is, the degree of chemical change resistance of the polymer is higher).

TABLE 1

| | |
|---|---|
| A-1 | 2,2-bis((3-dodecylthio)-1-oxypropyoxy)methyl)propan-1,3-diylbis(3-(dodecylthio)propionate)) (product name: Chinox S4P, manufactured by Double Bond Chem. Ind., Co., Ltd.) |
| B-1 | octadecyl 3-(3,5-di-tert-butyl-4-hydroxyphenyl)propionate (product name: Chinox 1076, manufactured by Double Bond Chem. Ind., Co., Ltd.) |
| B-2 | mixture of heptyl 3-(3,5-di-tert-butyl-4-hydroxyphenyl)propionate, octyl 3-(3,5-di-tert-butyl-4-hydroxyphenyl)propionate, and nonyl 3-(3,5-di-tert-butyl-4-hydroxyphenyl)propionate (product name: Chinox 35, manufactured by Double Bond Chem. Ind., Co., Ltd.) |
| C-1 | tris(nonylphenyl) phosphate (product name: Chinox TNPP, manufactured by Double Bond Chem. Ind., Co., Ltd.) |
| C-2 | tris(2,4-di-tert-butylphenyl) phosphite (product name: Chinox 168, manufactured by Double Bond Chem. Ind., Co., Ltd.) |
| C-3 | tridodecyl phosphite (product name: Chinox 312, manufactured by Double Bond Chem. Ind., Co., Ltd.) |
| Polymer | styrene-butadiene-styrene block copolymer (SBS) |

TABLE 2

| | | Experimental Example | | | | | | | | |
|---|---|---|---|---|---|---|---|---|---|---|
| | | 1 | 2 | 3 | 4 | 5 | 6 | 7 | 8 | 9 |
| Stabilizer (parts by weight) | A-1 | 0.150 | 0.225 | 0.300 | 0.050 | 0.075 | 0.100 | 0.050 | 0.075 | 0.100 |
| | B-1 | 0.300 | 0.450 | 0.600 | — | — | — | 0.100 | 0.150 | 0.200 |
| | B-2 | — | — | — | 0.150 | 0.225 | 0.300 | 0.050 | 0.075 | 0.100 |
| | C-1 | — | — | — | — | — | — | — | — | — |
| | C-2 | 0.050 | 0.075 | 0.100 | — | — | — | — | — | — |
| | C-3 | — | — | — | 0.300 | 0.450 | 0.600 | 0.300 | 0.450 | 0.600 |
| Polymer (parts by weight) | | 100 | 100 | 100 | 100 | 100 | 100 | 100 | 100 | 100 |
| $YI_0$ | | 1.51 | −3.15 | −4.72 | −1.51 | −5.80 | −6.41 | 1.47 | 0.05 | −2.51 |
| YI (160° C., 2 hours) | | 6.62 | 0.94 | −5.32 | 17.78 | −0.35 | −6.72 | 1.37 | 0.46 | −0.10 |
| YI (160° C., 3 hours) | | 16.46 | 6.27 | 4.83 | 24.56 | 14.50 | 8.06 | 17.86 | 7.44 | −1.38 |

TABLE 3

| | | Comparative example | | | |
|---|---|---|---|---|---|
| | | 1 | 2 | 3 | 4 |
| Stabilizer (parts by weight) | A-1 | — | — | — | — |
| | B-1 | — | 0.160 | 0.250 | 0.330 |
| | B-2 | — | — | — | — |
| | C-1 | — | 0.330 | 0.500 | 0.660 |
| | C-2 | — | — | — | — |
| | C-3 | — | — | — | — |

TABLE 3-continued

| | Comparative example | | | |
|---|---|---|---|---|
| | 1 | 2 | 3 | 4 |
| Polymer (parts by weight) | 100 | 100 | 100 | 100 |
| $YI_0$ | 5.35 | 3.37 | 2.38 | 1.97 |
| YI(160° C., 2 hours) | 28.18 | 26.66 | 19.68 | 18.08 |
| YI(160° C., 3 hours) | 32.92 | 39.65 | 31.97 | 29.97 |

Based on the above, in the invention, by including the first component of 2,2-bis((3-dodecylthio)-1-oxypropyoxy)methyl)propan-1,3-diylbis(3-(dodecylthio) propionate)), the second component of 3-(3,5-di-tert-butyl-4-hydroxyphenyl) propionic acid alkyl ester, and the third component (phosphorus-containing compound) in the stabilizer at the same time, the issue of poor degree of chemical change resistance (such as degradation, fading, or yellowing of the polymer) of the known polymer can be solved.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A stabilizer, comprising:
   a first component, wherein the first component is a compound represented by formula (1),

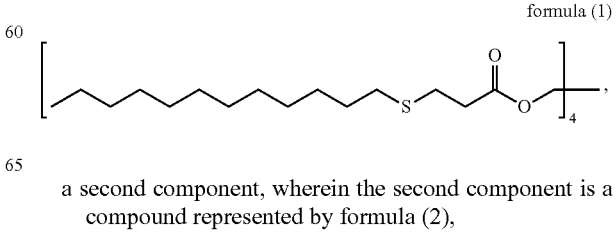

formula (1)

a second component, wherein the second component is a compound represented by formula (2),

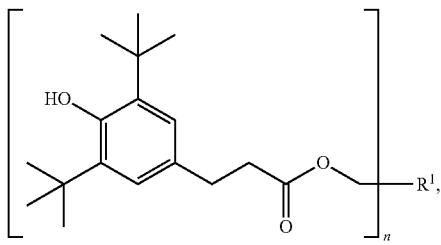

formula (2)

wherein n is 1 or 4, and when n is 1, $R^1$ is a $C_1$-$C_{18}$ alkyl group, and when n is 4, $R^1$ is 2,2-dimethylprop-1,3,1',1''-tetrayl; and a third component, wherein the third component is a compound represented by formula (3),

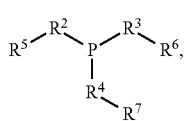

formula (3)

wherein $R^2$, $R^3$, and $R^4$ are each independently a single bond or oxygen, and $R^5$, $R^6$, and $R^7$ are each independently selected from the group consisting of a $C_1$-$C_{18}$ alkyl group, a $C_1$-$C_{18}$ alkyl group having a substituent, a $C_6$-$C_{15}$ aryl group, and a $C_6$-$C_{15}$ aryl group having a substituent, and wherein the third component comprises tris(2,4-di-tert-butylphenyl)phosphite, and wherein based on 100 wt % of the first component, the second component, and the third component, a content of the first component is 28 wt % to 33 wt %, a content of the second component is 58 wt % to 63 wt %, and a content of the third component is 8 wt % to 13 wt %.

2. The stabilizer of claim 1, wherein the second component is the compound represented by formula (2), and $R^1$ is selected from the group consisting of $C_7$, $C_8$, $C_9$, $C_{16}$, $C_{17}$, and $C_{18}$ alkyl groups.

3. The stabilizer of claim 1, wherein $R^2$, $R^3$, and $R^4$ are the same groups and $R^5$, $R^6$, and $R^7$ are the same groups, represented in formula (3).

4. The stabilizer of claim 1, wherein the second component is selected from the group consisting of heptyl 3-(3,5-di-tert-butyl-4-hydroxyphenyl)propionate, octyl 3-(3,5-di-tert-butyl-4-hydroxyphenyl)propionate, nonyl 3-(3,5-di-tert-butyl-4-hydroxyphenyl) propionate, hexadecyl 3-(3,5-di-tert-butyl-4-hydroxyphenyl)propionate, heptadecyl 3-(3,5-di-tert-butyl-4-hydroxyphenyl)propionate, and octadecyl 3-(3,5-di-tert-butyl-4-hydroxyphenyl)propionate.

5. The stabilizer of claim 1, wherein the third component further comprises tridecyl phosphite, triundecyl phosphite, tridodecyl phosphite, trioctadecyl phosphate, or a combination thereof.

6. The stabilizer of claim 1, wherein the first component is 2,2-bis((3-dodecylthio)-1-oxypropyoxy)methyl)propan-1,3-diylbis(3-(dodecylthio) propionate)), the second component is octadecyl 3-(3,5-di-tert-butyl-4-hydroxyphenyl) propionate, and the third component is tris(2,4-di-tert-butylphenyl)phosphite.

7. A composition, comprising:
a polymer; and
the stabilizer of claim 1, wherein based on 100 parts by weight of the polymer, a content of the stabilizer is 0.01 parts by weight to 2.00 parts by weight.

8. The composition of claim 7, wherein the polymer is a thermoplastic elastomer.

9. The composition of claim 7, wherein the polymer is selected from the group consisting of a styrene-butadiene-styrene block copolymer (SBS), a styrene-isoprene-styrene block copolymer (SIS), and a styrene-ethylene-butadiene-styrene block copolymer (SEBS).

* * * * *